(12) United States Patent
Michalowski

(10) Patent No.: US 6,695,163 B2
(45) Date of Patent: Feb. 24, 2004

(54) WATER BOTTLE WITH MOLDED-IN HANDLE

(76) Inventor: Richard M. Michalowski, 15127 Grandview Dr., Orland Park, IL (US) 60467

(*) Notice: Subject to any disclaimer, the term of this patent is extended or adjusted under 35 U.S.C. 154(b) by 0 days.

(21) Appl. No.: 10/173,811

(22) Filed: Jun. 19, 2002

(65) Prior Publication Data

US 2003/0234236 A1 Dec. 25, 2003

(51) Int. Cl.$^7$ ............................................... B65D 23/10
(52) U.S. Cl. .................. 215/398; 215/384; 215/396; 220/755; 220/771
(58) Field of Search .................... 215/396, 398, 215/383, 384; 220/755, 757, 761, 771; 229/401, 402

(56) References Cited

U.S. PATENT DOCUMENTS

| | | | |
|---|---|---|---|
| D166,832 S | * 5/1952 | Thompson et al. | ...... 220/771 X |
| D194,285 S | * 12/1962 | Miller | ...... 220/771 X |
| 3,443,710 A | 5/1969 | Hills | |
| 4,222,560 A | * 9/1980 | Hallerman | .......... 272/68 |
| 4,572,384 A | 2/1986 | Vesborg | |
| 4,873,100 A | 10/1989 | Dirksing et al. | |
| 5,000,353 A | * 3/1991 | Kostanecki et al. | ...... 222/207 |
| 5,207,338 A | * 5/1993 | Sandhu | ...... 220/771 X |
| D337,947 S | 8/1993 | Lauter | |
| 5,320,231 A | 6/1994 | Iodice | |
| 5,469,612 A | * 11/1995 | Collette et al. | ......... 215/396 X |
| D376,104 S | 12/1996 | Gerhart et al. | |
| 5,833,115 A | 11/1998 | Eiten | |
| 5,836,469 A | * 11/1998 | Zebrowski | ............ 215/384 |
| 5,908,136 A | * 6/1999 | Mrak | .......... 220/771 X |
| 5,927,533 A | 7/1999 | Payne et al. | |
| 5,971,184 A | * 10/1999 | Krishnakumar et al. | .... 215/384 |
| 6,223,920 B1 | 5/2001 | Lane et al. | |
| 6,237,792 B1 | 5/2001 | Skolnicki et al. | |
| 6,446,830 B1 | * 9/2002 | Ocic | .......... 220/771 |

FOREIGN PATENT DOCUMENTS

| | | | |
|---|---|---|---|
| EP | 0206749 A2 | * 12/1986 | |
| FR | 2739610 | * 4/1997 | |
| JP | 8192849 | * 7/1996 | |
| JP | 411321835 A | * 11/1999 | |

* cited by examiner

Primary Examiner—Sue A. Weaver
(74) Attorney, Agent, or Firm—Richard C. Litman

(57) ABSTRACT

A water bottle with an integrally molded handle in which the opening defined by the handle has a contour that corresponds substantially to the contours of the fingers of the hand when the bottle is held during use. The bottle can include a series of ribs and furrows approximately matching the contour of the insides of the fingers that allow the user to securely grip the bottle during use. In a second embodiment the integrally molded handle is attached by a fluted arrangement and can be extended from or collapsed to the sides of the bottle.

1 Claim, 5 Drawing Sheets

WATER BOTTLE WITH MOLDED-IN HANDLE

BACKGROUND OF THE INVENTION

1. Field of the Invention

The present invention relates to bottles for use as drinking containers. More particularly, the drinking container of the invention is a single-piece, molded plastic bottle with an integrally molded handle having contours inside the handle opening and along the outside of the bottle that are shaped to approximately match the contours of the fingers of a hand when holding and using the bottle. In an alternative embodiment, the handle is attached to the bottle using a fluted arrangement so that it can be collapsed or extended, i.e., is connected to the bottle by an "accordion" structure.

2. Description of the Related Art

Plastic bottles used for drinking beverages, such as water, etc., are well known. They are typically molded as a single piece of plastic, e.g., a polyester or polycarbonate, using conventional injection molding techniques. However, there is a need for a bottle used for drinking beverages in which the handle opening and the sides of the bottle are contoured to match the shape of the hands, so that the bottle can be gripped firmly during use. In an alternative embodiment, the bottle has a handle that can be easily extended or collapsed, i.e., "accordion-style".

U.S. Design Pat. No. 337,947, issued to Lauter on Aug. 3, 1993, teaches a plastic container having an accordion spout. The container lacks a suitable handle that is shaped to match the inner contours of the hands when holding the container.

In U.S. Pat. No. 3,443,710, issued to Hills on May 13, 1969, the handle includes a ribbed contour (see FIG. 4).

U.S. Pat. No. 4,572,384, issued to Vesborg on Feb. 25, 1986, teaches a container having an integral handle, used especially for detergents.

U.S. Pat. No. 4,873,100, issued to Dirksing et al. on Oct. 10, 1989, teaches a bellows-shaped bottle that can be expanded or collapsed.

U.S. Pat. No. 5,320,231, issued to Iodice on Jun. 14, 1994, teaches an adult personal care bottle having an integrally molded handle and a contoured outer surface.

U.S. Pat. No. 5,833,115, issued to Eiten on Nov. 10, 1998, U.S. Pat. No. 5,927,533, issued to Payne et al. on Jul. 27, 1999, U.S. Pat. No. 6,223,920, issued to Lane et al. on May 1, 2001, and U.S. Pat. No. 6,237,792, issued to Skolnicki et al. on May 29, 2001, and U.S. Design Pat. No. 376,104, issued to Gerhart et al. on Dec. 3, 1996, all teach plastic bottles having various ribs and furrows integrally built along the sides of the containers.

None of the above inventions and patents, taken either singly or in combination, is seen to describe the instant invention as claimed. Thus a water bottle with an integrally molded handle solving the aforementioned problems is desired.

SUMMARY OF THE INVENTION

The present invention is directed to a bottle used for drinking fluids such as water or beverages. The bottle has surface contours and an integrally molded handle that correspond approximately with the contours of the fingers of a hand when the bottle is being held during use. The inner shape of the handle corresponds approximately to the outer contours of the fingers of the hand during use. The outer surface of the bottle includes several ribs and furrows that are shaped and sized approximately to the shape and size of the fingers and extend in the same approximate direction as the fingers. The overall size of the handle opening can be dimensioned to approximate the size of two, three or four closed fingers.

Accordingly, it is a principal object of the invention to provide a plastic bottle for drinking liquids, such as water, in which the handle shape is contoured to approximately match the contours of the fingers of the hand during use of the bottle.

It is another object of the invention to provide a plastic bottle as described above, having a surface contour that approximately matches the contours of the fingers during use.

It is a further object of the invention to provide a plastic, bottle as described, in which the handle is integrally attached to the bottle by a fluted arrangement and can be collapsed or extended, i.e., accordion-style.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to plastic molded bottles, particularly in which the handle is integrally molded with the bottle and is contoured to substantially match the contours of the hand during use.

Figure 1A:
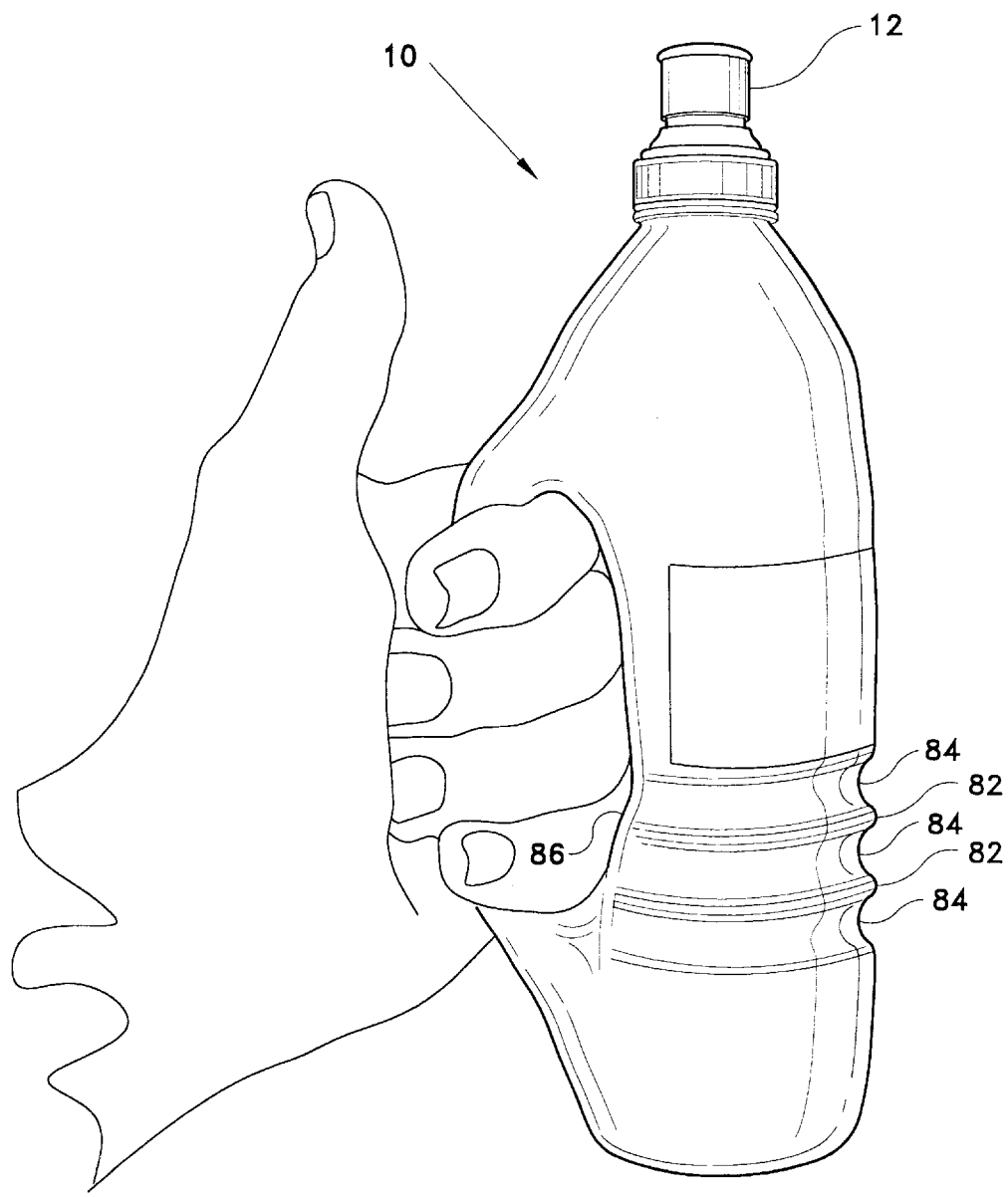
FIGS. 1A and 1B are environmental, perspective views of a first embodiment of a water bottle with an integrally molded handle according to the present invention held in two different hand-held orientations, i.e., with the hand holding the handle alone and with the hand holding the bottle.
Figure 1B:
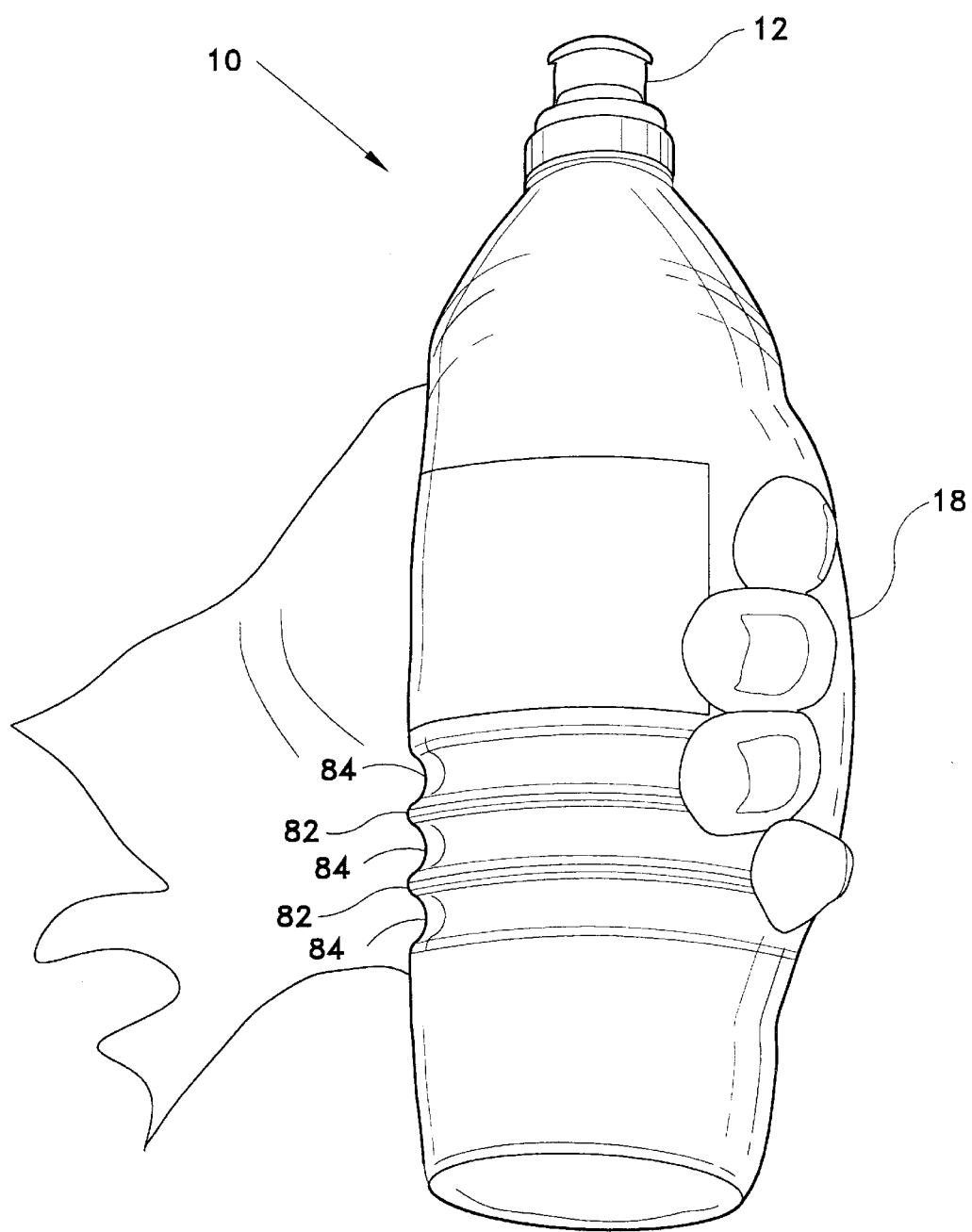

FIGS. 1A and 1B show a perspective view of a first embodiment of the water bottle 10 with an attached push-pull spout 12 showing the bottle being held during use. The opening defined by the handle 18 has a contour 86 to substantially match the contours of the fingers of the hand for a comfortable and secure grip when holding the bottle 10 during use. Additionally, the sides of the bottle include ribs 82 and furrows 84 that are shaped to approximate the contours of the fingers so that the bottle 10 may be held by gripping the handle 18 alone, as shown in FIG. 1A, or by wrapping the fingers around the body of the bottle and then through the handle, as shown in FIG. 1B.

The shaped contours of the handle opening and the sides of the bottle 10 permit the user to comfortably hold the bottle 10 during use, as well as to preventing the bottle 10 from easily slipping out of the grip of the user. Conventional bottles can slip out of a user's grip, for example, during use when the user is jogging or riding a bicycle and hits a sudden bump that dislodges the bottle, from the user's grip. The contoured handle and sides of the bottle 10 prevent this occurrence.

Thus, when the bottle 10 is held by the handle 18 alone as shown in FIG. 1A, the contours of the opening defined by the handle 18 permit a secure grip of the bottle 10. Similarly, when the bottle 10 is alternatively held with the hand wrapped around the body of the bottle 10 and placed inside the handle 18 as shown in FIG. 1B, the bottle 10 can again be held firmly and securely.

Figure 2:
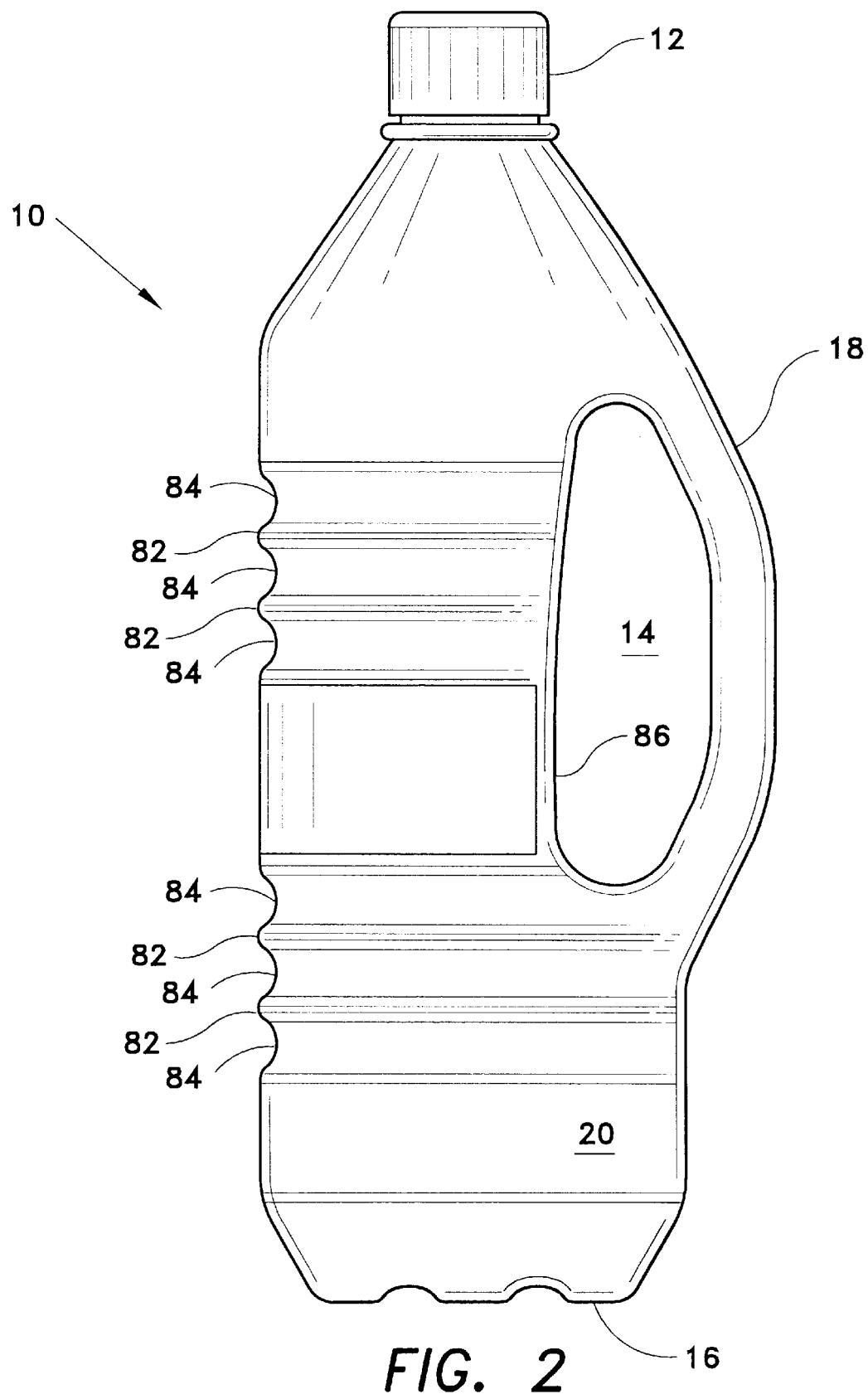
FIG. 2 is a side view of a modified version of a first embodiment of the water bottle.

FIG. 2 shows a modified version of the first embodiment of the water bottle 10 in which additional ribs and furrows are provided in the side 20 to extend ribs 82 and furrows 84 further over the surface of the bottle than the embodiment shown in FIGS. 1A and 1B. The top 12, handle 18, handle opening 14, and bottom 16 of the bottle 10 are substantially the same as shown in FIGS. 1A and 1B, or the cap 12 may be simply a screw cap rather than the pop-up nipple shown in FIGS. 1A and 1B.

Figure 3:
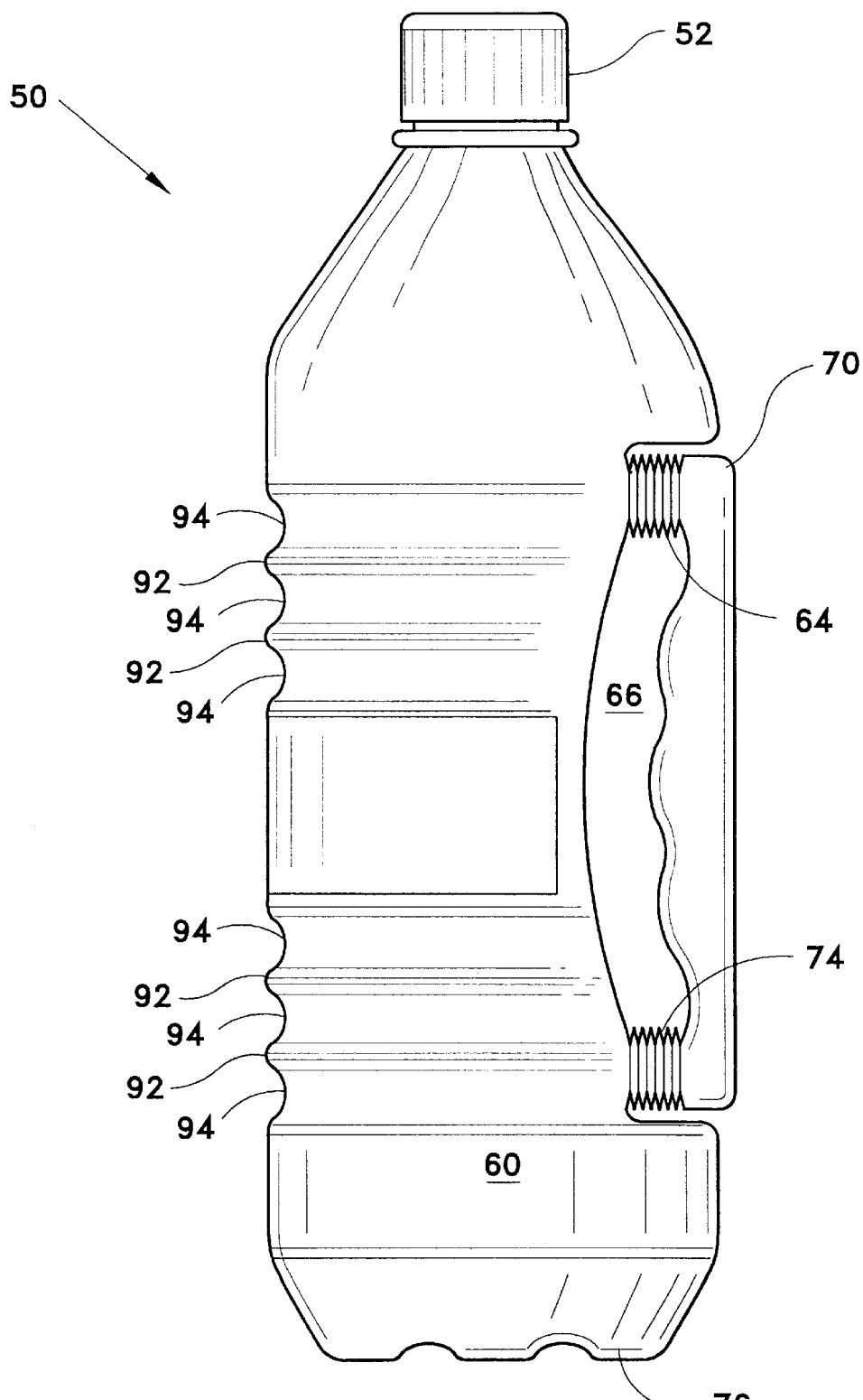
FIG. 3 is a side view of a second embodiment of a water bottle having a handle attached by a fluted structure showing the handle in the collapsed position.
Figure 4:
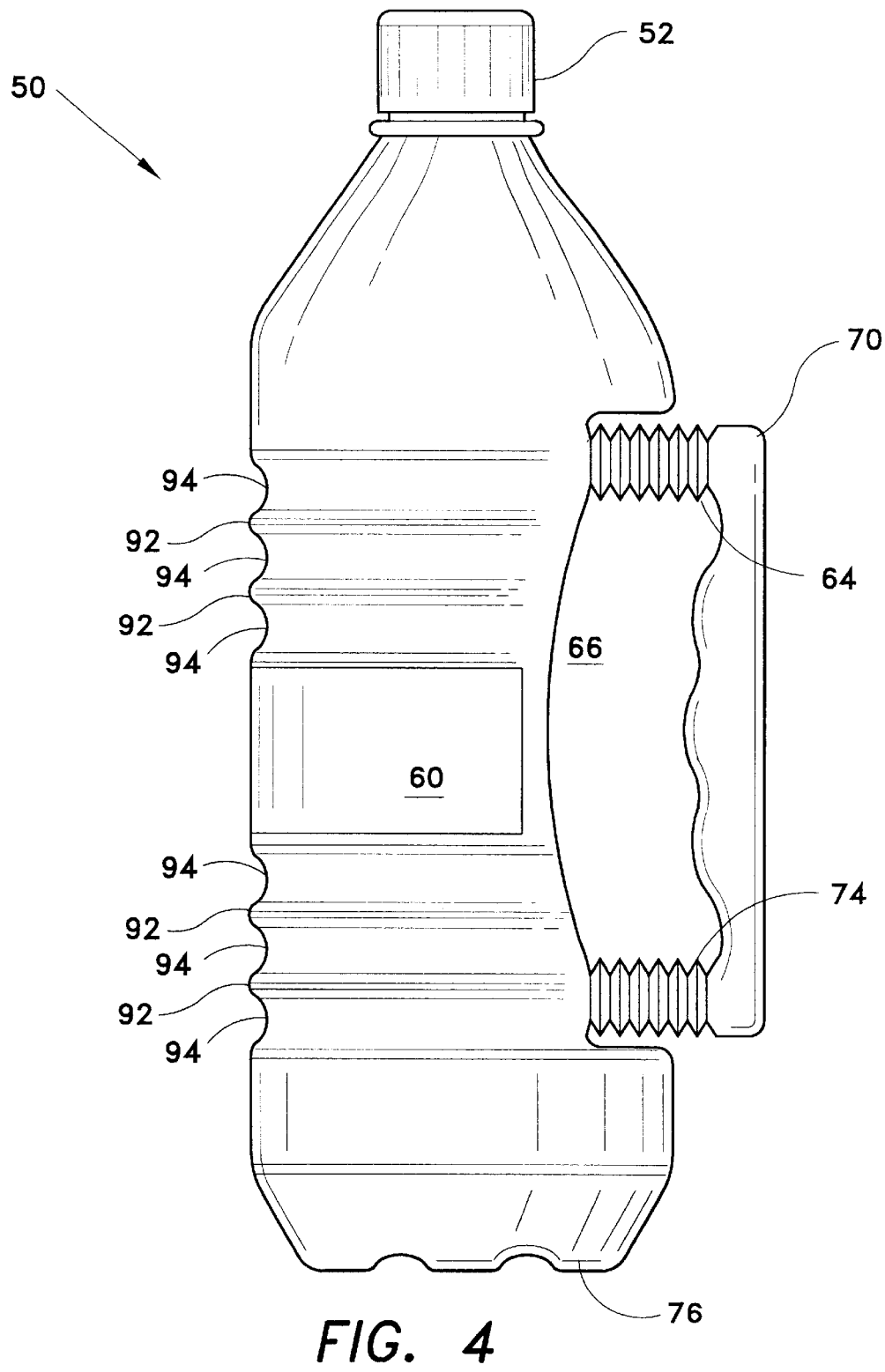
FIG. 4 is a side view of the second embodiment showing the handle in the extended position.

FIGS. 3 and 4 show a bottle 50 according to a second embodiment in which the handle 70 is integrally attached to the bottle through a fluted connection, 64 and 74. The opening 66 of the handle 70 is contoured to approximate the shape of the fingers when holding the bottle. The handle 70 can be placed in either of two bistable positions: a collapsed position as shown in FIG. 3 and an extended position as shown in FIG. 4. Ribs 92 and furrows 94 contoured to the shape of the fingers provide additional gripping surface. Flat portion 60 is provided for placing a label. Bottom 76 may be flat or may have projecting lobes for supporting the bottle 50, as desired. Cap 52 may be a pop-up nipple, or a simple screw-on cap.

The materials used for the bottles of the present invention are conventional plastics that can be injection-molded, e.g., polyester or polypropylene.

It is to be understood that the present invention is not limited to the embodiments described above, but encompasses any and all embodiments within the scope of the following claims.

I claim:

1. A bottle for holding and for simultaneously drinking beverages, comprising:

a container having a body adapted for containing a drinking beverage, the body having a plurality of outwardly projecting ribs and inwardly projecting furrows for gripping the bottle; and a handle integrally built into the body, wherein the handle defines an opening having a contour sized and configured to substantially match the contours of the fingers of a hand during use;

wherein said container and said handle are formed from a single piece of molded plastic.

* * * * *